March 17, 1953  
J. MacVEIGH ET AL  
COUPLER AND LOAD SUPPORT FOR TRAILER TYPE RAIL VEHICLES  
2,631,738

Filed June 22, 1950

INVENTORS.
JAMES MacVEIGH
FRANCISCO M. F. HEREDIA
BY

George R. Ericson
ATTORNEY.

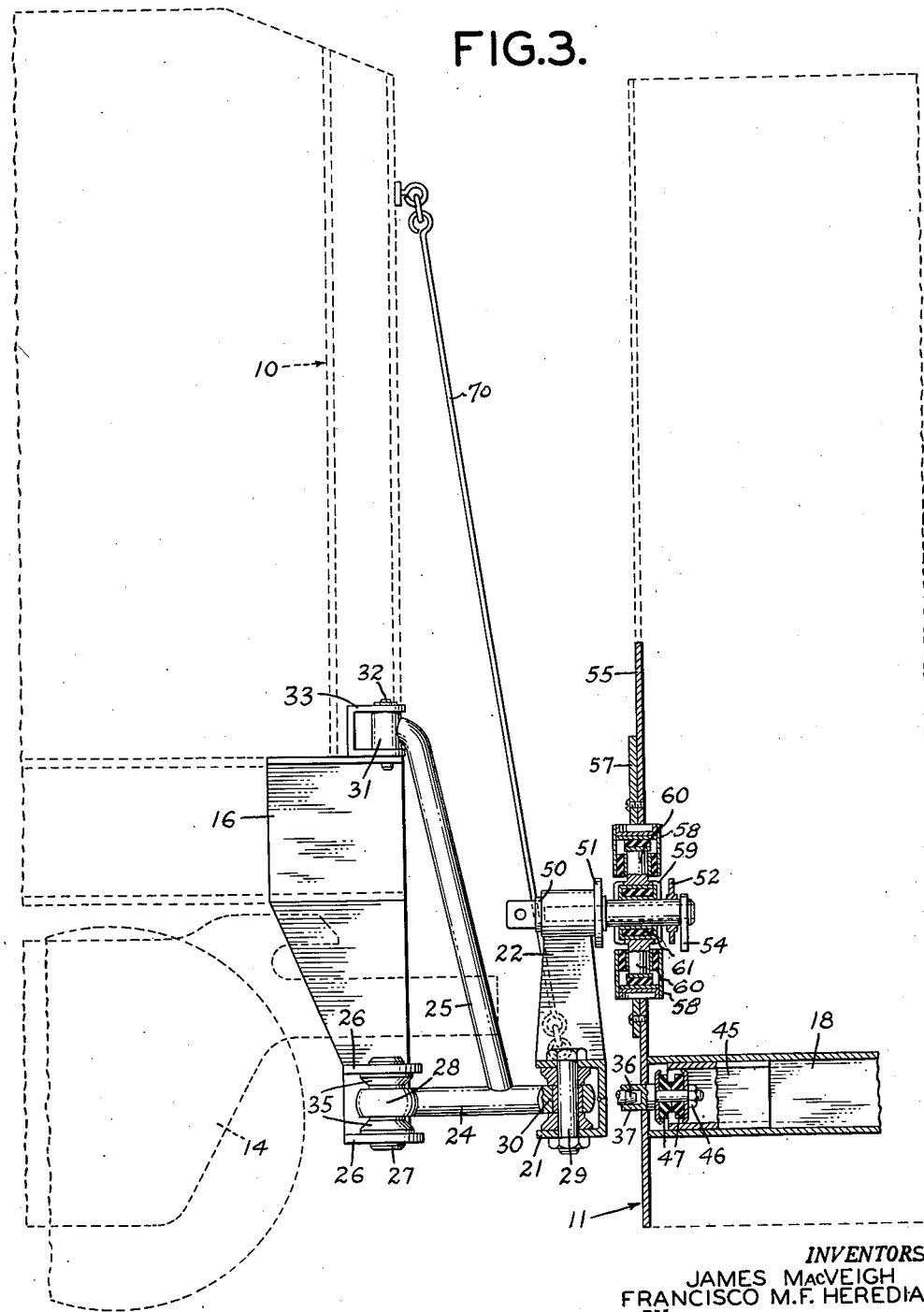

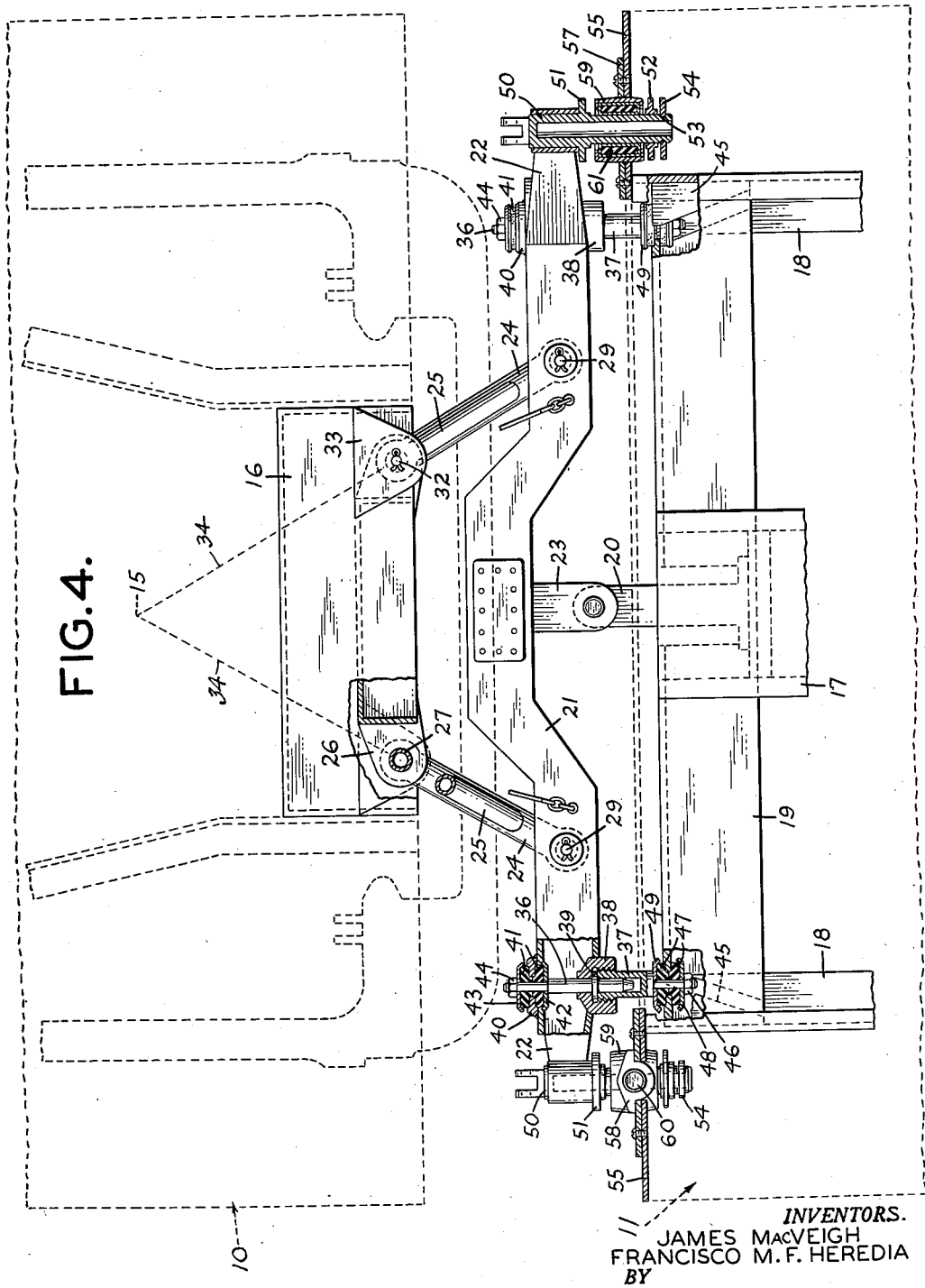

Patented Mar. 17, 1953

2,631,738

UNITED STATES PATENT OFFICE 2,631,738

COUPLER AND LOAD SUPPORT FOR TRAILER TYPE RAIL VEHICLES

James MacVeigh, New York, N. Y., and Francisco M. F. Heredia, Madrid, Spain, assignors to Patentes Talgo, S. A., Madrid, Spain Application June 22, 1950, Serial No. 169,718

9 Claims. (Cl. 213—3)

1

This invention relates to a coupling device for railroad tractors to facilitate coupling such tractors to an articulated train.

The proper operation of an articulated train comprised of pivoted two-wheel sections or trailers, such as that shown in Omar Patent 2,462,666, is dependent upon keeping the traction pivot at the front end of each section at or near the median line of the track. With all the sections, except the front one, this may be accomplished by a traction pivot at the front of each section located at or near the axis of the wheels of the preceding section. If the articulated train is drawn by a tractor having a pair of wheels at or very near its rear end, the traction pivot at the front end of the articulated vehicle may be kept in median position by mounting it on the tractor at or near the rear axle of the tractor, as shown for example in Spanish Patent 163,239, and shown diagrammatically in Fig. 14 of said Omar patent.

Railroad tractors of the type now commonly used are mounted on four-wheel trucks and have bodies overhanging their supports to a considerable extent at the rear end of the tractor. When such a tractor is on a curved track, the rear end of its body is swung outwardly well outside the median line of the tracks as appears from the body of the tractor 10 indicated in dotted lines in Fig. 2. If an articulated vehicle such as that of the Omar patent has its front section pivoted to the rear end of the body of such a tractor, the front end of the front section is thrown so far outside the median line of the track on curves that it fails to operate like the other sections with its wheels turned inwardly on curves.

The present invention relates to an attachment which may be permanently mounted on a tractor having an overhanging rear end and which provides a convenient means for coupling the tractor to the front section of an articulated vehicle in such manner that the front end of this section is displaced very little from the median line of the track on curves.

A traction attachment incorporating the invention includes two rigid triangular frames hinged on the rear end of the tractor on vertical hinge lines and a transverse bar supported by the hinged frames and pivotably secured to them at points spaced further apart than the hinge lines. The bar is provided with devices for detachably engaging the coupling element and the weight-supporting elements normally provided at the front end of a section of an articulated train. The trapezoidal position of the rigid

2 frames which are hinged to the tractor and pivoted to the bar have the effect of maintaining the front end of the front section of the articulated train at or near the median line of the tracks just as if it were pivoted on the tractor at some distance forward from the rear end of the tractor body.

An object of the invention is to provide a device for use between a locomotive and trailer vehicle that will serve both as a coupler and a load support for the front end of the trailer vehicle.

A further object of the invention is to provide a coupling device for railway trains in which a beam carries both a coupler member and load supporting pins at each side of the coupler member.

Another object of the invention is to provide a coupling device with a beam for carrying a coupler member and rod devices acting to guide the coupler member into engagement with the coupler member of the following vehicle and to also absorb some of the buffing forces.

These and other objects of the invention will be apparent to those skilled in the art from a study of the following description and accompanying drawings, in which:

Figure 3 is a side elevational view of the adjacent ends of two vehicles with the coupling device therebetween.

Figure 4 is a plan view of the adjacent ends of two vehicles on a straight track with the coupling device therebetween.

Figure 1:
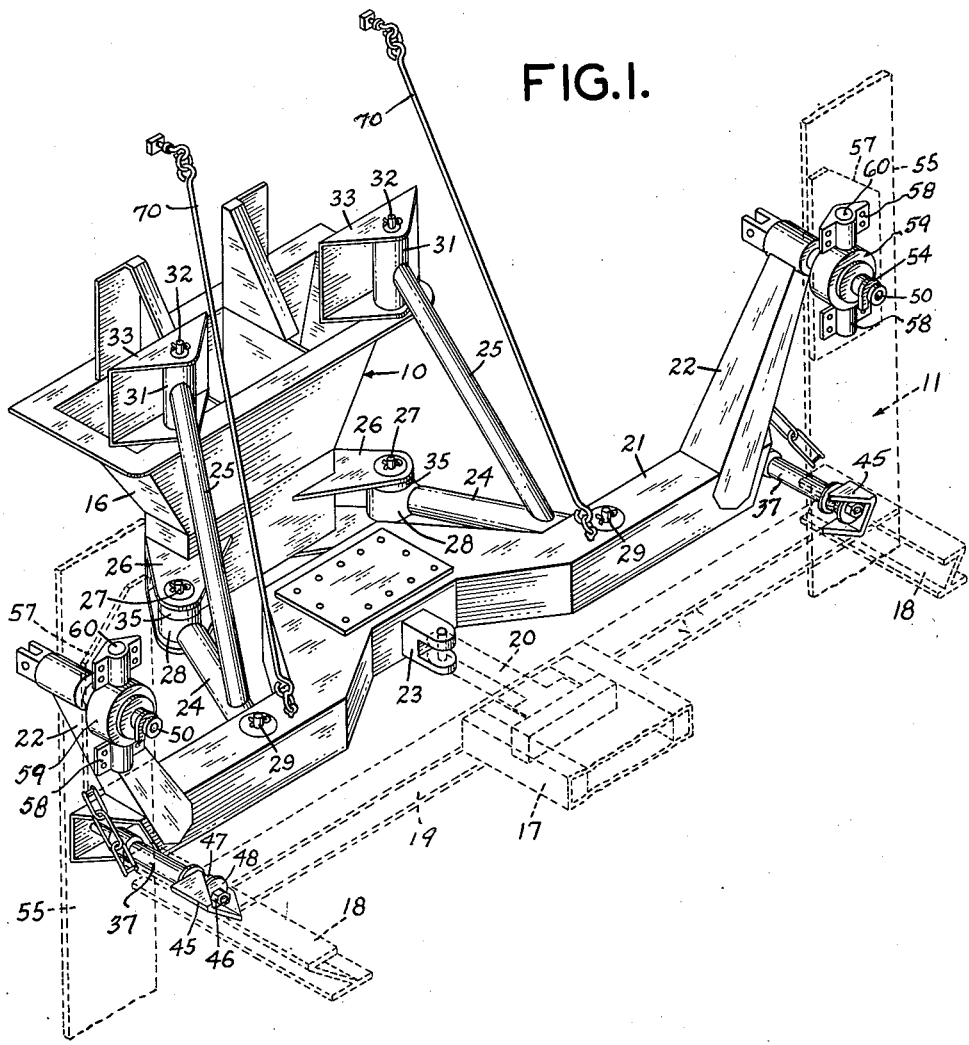
Figure 1 is a perspective view of the coupling device connecting a locomotive rear end with the front end of a following vehicle.

The illustrated railroad train consists of a locomotive or traction vehicle 10 and a plurality of following vehicles 11.

The coupling device forming the subject matter of this invention connects the traction vehicle and the adjacent following vehicle. The following vehicles are preferably of the trailer type mounted on a rear axle 12 carrying wheels 13. The traction or leading vehicle is mounted on forward and rear four wheel truck 14 which are pivotally connected thereto, the pivot point of the rear truck being indicated by numeral 15. The coupling device can be applied to any conventional railroad traction vehicle and the rear end framing thereof is indicated by numeral 16.

The trailing vehicles are similar and have underframing including center sill 17 and side sills 18 suitably connected by cross members as indicated by numeral 19. A coupler member 20 is mounted at the front end of the vehicles 11 and provision is made at such ends for the reception of vertical supporting means and for association with means on the coupling device to guide the coupler members into engaging relation and assist in resisting buffing forces, such means forming a part of the coupling device.

In the coupling device, hollow beam 21 extends transversely and is substantially the same width as the vehicles. Arms 22 extend upwardly from adjacent the ends of the beam and are rigidly secured thereto. Coupler member 23 is fixed to and extends rearwardly from the center of the rear face of the beam, such coupling member being located to engage with the coupler member 20 on the trailing vehicle. A pair of similar draft and supporting devices connect the beam with the rear end of the traction vehicle. Each device consists of a rigid frame which includes a horizontally extending draft link 24 and an inclined rod 25 secured rigidly at its base to the link. Brackets 26 on the end framing of the traction vehicle carry pins 27 on which eyes 28 at the forward ends of the draft links are pivotally mounted and the beam carries pins 29 on which eyes 30 at the rear ends of the draft links are pivotally mounted. The upper ends of the inclined rods 25 are formed with eyes 31 that are pivotally mounted on pins 32 carried by brackets 33 fixed to the end framing of the traction vehicle. The axis of each pin 32 lies on the same vertical line as the axis of one of the pins 27, so that each pair of pins 27, 32 constitutes a hinge for one of the draft and supporting devices. Rubber disks 35 surround pins 27 between the ears of the brackets 26 and the link eyes 28 allowing a slight vertical tipping of the draft and supporting devices.

Links 24 are equally spaced on the beam from coupler member 23 and converge toward the traction vehicle so that lines 34, extended from the axes thereof, will intersect in advance of the rear end of the locomotive, for example, at the rear locomotive truck pivot point 15 when the following vehicle is on a straight track. If the lines 34 intersect at the point 15, the hinged frames will maintain the center line of the tractor following the locomotive in such a position that an extension of it passes through the point 15 when the train is on a curved track.

Similar guide and buffer means are carried adjacent each end of the beam and include rod structures formed of sections 36, 37 and 38. Rod section 36 extends through beam 21 and section 38 and projects into a hollow end of section 37. Flange 39 on section 36 is clamped in section 38 by the rear end of section 37 which screws into section 38. Section 38 has a sliding fit in an opening in the rear wall of the beam and section 36 extends through a plate 40 fixed to the front of the coupling beam. Rubber disks 41 surround the rod sections 36 on opposite sides of plates 40 and bear against retainer seat members 42 and 43. Retainer members 42 bear against shoulders on the rod sections 36 and retainer members 43 are engaged by nuts 44 screwed on the end of the rod sections 36. This manner of mounting the guide rod structures on the coupling beam permits limited axial movement which is resisted by the rubber disks.

The front end of the following vehicle 11 is provided with anchor brackets 45 for receiving the guide rod structure, such brackets being suitably secured to the side sills 18. The reduced diameter rear ends of guide rod sections 37 are located to be projected through openings in the front walls of the brackets and they are releasably secured by nuts 46 secured on their rear ends. Rubber disks 47 surround the reduced ends of rod sections 37 and bear against opposite faces of the brackets. Retainer members 49 lie between the front disks and the shoulders of rod sections 37 and the brackets while retainer members 48 lie between nuts 46 and the rear disks. The rod structures when positioned with the following car serve to guide the coupler members 20 and 23 into mating position and to retain them in coupled position. The rubber mounting of the guide rod structures with the coupling beam and the following car brackets will absorb some of the buffing forces that would otherwise pass through the coupler device.

The following car is supported at its front end on similar load carrying hollow pins 50 suitably fixed at the upper ends of coupling beam arms 22. The pins have forward integral flanges 51 and removable rear flanges 52 and are formed with grooves 53 for the reception of detachable locking devices such as sectional disks 54. End wall sections 55 of the following cars are provided with similar carrier means for receiving the load supporting pins. Such carrier means each include a supporting plate 57, suitably fixed to the end wall, carrying brackets 58, a sleeve 59 having vertically extending swivel pins 60 mounted in the brackets and a rubber bushing 61 in the sleeve through which the load supporting pin extends. The load supporting pins are thus mounted to permit relative lateral movement with the following vehicle, limited universal movement in sleeves 59 as allowed by rubber bushings 61 and limited axial movement relative to the following vehicle as allowed by members 51 and 52. The load supporting pins can be detached from the following vehicle upon removal of members 52 and 54 and the guide rod structures can be detached from the following vehicle upon removal of nuts 46. As all of the following cars have similar coupler members and accommodations for receiving the load supporting pins and the guide rod structures at their front ends, any car can be coupled directly to the coupling device on the locomotive. Safety links 70 are connected to the rear framing of the locomotive and to the top of beam 21.

Figure 2:
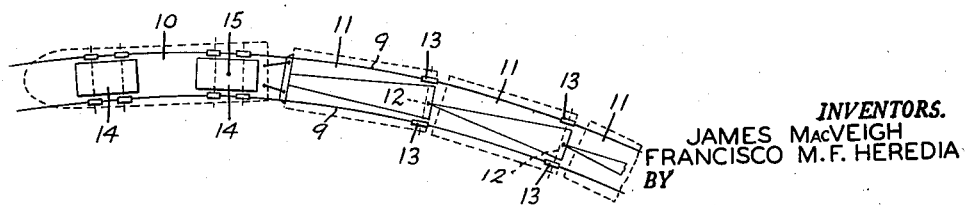
Figure 2 is a diagrammatic plan view of a train on a curved track showing the coupling between the locomotive and the trailer vehicle.

In operation on straight track, since the car and locomotive ends are parallel to each other and the draft devices 24 are identical and of equal length, the quadrilateral formed by the locomotive end and coupling beam, and the draft devices 24 is an isosceles trapezoid, and since the locomotive exerts an equal pull on the draft devices, the front of the following vehicle is centered with respect to track rails 9. When the train rounds a curve, as diagrammatically shown in Fig. 2, the quadrilateral thus formed ceases to be trapezoid, since the locomotive end and coupling beam are no longer parallel. Since the rear end of the locomotive, and the pivot points thereon remain a fixed distance from the center of a curve of constant radius, and since all sides of the quadrilateral are of fixed length, draft devices 24 and the beam 21 attached to the front end of the following car change their positions with respect to the track, the rear ends of draft devices 24 moving closer to the center of the curve. This causes the center of the coupling beam and associated front end of the following vehicle to move closer to the center of the curve, and consequently cause the vertical plane of the following wheels to be directed slightly inwardly with respect to the curve, thereby reducing the tendency to climb over the outer rail head. In the specific arrangement shown in Fig. 2, it is apparent that the wheels of the first trailer will be directed inwardly to a greater extent than the wheels of the following trailers because the distance from the wheels of the first trailer to the pivot 15 of the rear truck of the locomotive is greater from the distance from the wheels of the second trailer to the pivot 12 on the first trailer. When it is desired to make the inclination of the wheels of the first trailer the same as that of the other trailers, the draft links 24 are inclined so as to meet at a point on the axis of the locomotive between the point 15 and the rear end of the locomotive.

The coupling members are engaged by backing the locomotive toward the following car and such engagement is assured by the guide rod structures being first engaged with their receiving structures on the following vehicle. At the same time the load bearing pins are projected into their receiving structures on the following car. Thus, the locomotive can be coupled with the following car without requiring a trainman to stand between the vehicles.

The invention may be modified in various respects as will occur to those skilled in the art and the exclusive use of all modifications as come within the scope of the appended claims is contemplated.

What is claimed is:

1. A coupling device for connecting two railway vehicles of which the leading one has wheel trucks pivoted thereunder and the following one is a trailer with a forward coupler member comprising a transversely extending beam, a coupler member on the beam adapted to be engaged with the coupler member on the trailer, guide rods carried by the end portions of the beam adapted to be detachably fastened to the forward end of the trailer, forwardly converging draft links pivoted on the beam equal distances from the coupler member and adapted to be pivotally connected to the rear end of the leading vehicle, said draft links being disposed so that axial lines continued therefrom intersect under the leading vehicle, and inclined rods whose lower ends are rigidly secured to the draft links and whose upper ends are adapted to be pivotally connected to the rear end of the leading vehicle on the same vertical line on which the front ends of the draft links are pivoted.

2. A coupling device for connecting two railway vehicles of which the leading one has wheel trucks pivoted thereunder and the following one is a trailer with a forward coupler member comprising a transversely extending beam, a coupler member on the beam adapted to be engaged with the coupler member on the trailer, guide rods carried by the end portions of the beam adapted to be detachably fastened to the forward end of the trailer, forwardly converging draft links pivoted on the beam equal distances from the coupler member and adapted to be pivotally connected to the rear end of the leading vehicle, said draft links being disposed so that axial lines continued therefrom intersect under the leading vehicle, inclined rods whose lower ends are rigidly secured to the draft links and whose upper ends are adapted to be pivotally connected to the rear end of the leading vehicle on the same vertical line on which the front ends of the draft links are pivoted, and means fixed to the beam adapted to support the front end of the following vehicle.

3. A coupling device for connecting two railway vehicles of which the leading one has wheel trucks pivoted thereunder and the following one is a trailer with a forward coupler member comprising a transversely extending beam having upstanding arms adjacent its ends, a coupler member on the beam adapted to be engaged with the coupler member on the trailer, guide rods carried by the end portions of the beam adapted to be detachably fastened to the forward end of the trailer, forwardly converging draft links pivoted on the beam equal distances from the coupler member and adapted to be pivotally connected to the rear end of the leading vehicle, said draft links being disposed so that axial lines continued therefrom intersect under the leading vehicle, inclined rods whose lower ends are rigidly secured to the draft links and whose upper ends are adapted to be pivotally connected to the rear end of the leading vehicle on the same vertical line on which the front ends of the draft links are pivoted, and load supporting pins carried by the beam arms adapted to be engaged with the front end of the following vehicle.

4. A coupling device for connecting two railway vehicles of which the leading one has wheel trucks pivoted thereunder and the following one is a trailer with a forward coupler member comprising a transversely extending beam, a coupler member on the beam adapted to be engaged with the coupler member on the trailer, guide rod structures extending rearwardly from the end portions of the beam adapted to be detachably fastened to the forward end of the trailer, mounting means for the guide rod structures on the beam permitting limited axial movement thereof, forwardly converging draft links pivoted on the beam equal distances from the coupler member and adapted to be pivotally connected to the rear end of the leading vehicle, said draft links being disposed so that axial lines continued therefrom intersect under the leading vehicle, and inclined rods whose lower ends are rigidly secured to the draft links and whose upper ends are adapted to be pivotably connected to the rear end of the leading vehicle on the same vertical line on which the front ends of the draft links are pivoted.

5. A coupling device for connecting two railway vehicles of which the leading one has wheel trucks pivoted thereunder and the following one is a trailer with a forward coupler member comprising a transversely extending beam, a coupler member on the beam adapted to be engaged with the coupler member on the trailer, guide rod structures extending rearwardly from and through the end portions of the beam and adapted to be detachably fastened to the forward end of the trailer, rubber mountings on the beam for the rod structures permitting limited axial movement thereof, forwardly converging draft links pivoted on the beam equal distances from the coupler member and adapted to be pivotally connected to the rear end of the leading vehicle, said draft links being disposed so that axial lines continued therefrom intersect under the leading vehicle, and inclined rods whose lower ends are rigidly secured to the draft links and whose upper ends are adapted to be pivotably connected to the rear end of the leading vehicle on the same vertical line on which the front ends of the draft links are pivoted.

6. The combination with a railroad trailer having coupling and weight-supporting elements at its front end and a tractor having an overhanging rear end, of a pair of rigid triangular frames pivoted on the rear end of the tractor on vertical hinge lines equally spaced at opposite sides of the axis of the tractor, a transverse bar supported on the outer ends of the hinged frames and pivoted to them at points spaced more widely than their hinge lines, and means on said bar for detachably engaging the coupling and weight-supporting elements of the trailer.

7. The combination with a railroad trailer having a central coupling element and lateral weight-supporting elements at its front end and a tractor having an overhanging rear end, of a pair of rigid triangular frames pivoted on the rear end of the tractor on vertical hinge lines equally spaced at opposite sides of the axis of the tractor, a transverse bar supported on the outer ends of the hinged frames and pivoted to them at points spaced more widely than their hinge lines, a coupling element at the middle of the bar for detachably engaging the coupling element of the trailer, upwardly extending arms at the ends of the bar, and means on the ends of the arms for detachably engaging and supporting the weight-bearing elements of the trailer.

8. The combination with a railroad trailer having a central coupling element and telescopic weight-supporting elements at its front end and a tractor having an overhanging rear end, of a pair of rigid triangular frames pivoted on the rear end of the tractor on vertical hinge lines equally spaced at opposite sides of the axis of the tractor, a transverse bar supported on the outer ends of the hinged frames and pivoted to them at points spaced more widely than their hinge lines, a coupling element at the middle of the bar for detachably engaging the coupler element of the trailer, and telescopic elements at the ends of the bar for detachably engaging and supporting the telescopic elements of the tractor.

9. The combination with a railroad trailer having coupling and weight-supporting elements at its front end and a tractor having an overhanging rear end, of a pair of rigid triangular frames pivoted on the rear end of the tractor on vertical hinge lines equally spaced at opposite sides of the axis of the tractor, a transverse bar supported on the outer ends of the hinged frames and permanently pivoted to them at points more widely spaced than their hinge lines, means on said bar for detachably engaging the coupler and weight-supporting elements of the trailer, and cooperating guiding means on the bar and the front end of the trailer for guiding the coupling and weight-bearing elements of the bar and trailer into engagement.

JAMES MacVEIGH.
FRANCISCO M. F. HEREDIA.

REFERENCES CITED

The following references are of record in the file of this patent:

UNITED STATES PATENTS

| Number | Name | Date |
| --- | --- | --- |
| 296,859 | Mark | Apr. 15, 1884 |
| 2,279,993 | Janeway | Apr. 14, 1942 |
| 2,601,928 | Walsh et al. | July 1, 1952 |

FOREIGN PATENTS

| Number | Country | Date |
| --- | --- | --- |
| 163,239 | Spain | Nov. 27, 1943 |